United States Patent [19]

Watanabe et al.

[11] Patent Number: 4,830,397

[45] Date of Patent: May 16, 1989

[54] VEHICLE SUSPENSION SYSTEM HAVING VARIABLE SUSPENSION PROPERTIES

[75] Inventors: Kenichi Watanabe; Shin Takehara; Hiroo Shimoe; Akihiko Miyoshi; Shoich Kamimura, all of Hiroshima, Japan

[73] Assignee: Mazda Motor Corporation, Hiroshima, Japan

[21] Appl. No.: 111,940

[22] Filed: Oct. 23, 1987

[30] Foreign Application Priority Data

| Oct. 24, 1986 | [JP] | Japan | 61-252001 |
| Oct. 24, 1986 | [JP] | Japan | 61-252002 |
| Oct. 24, 1986 | [JP] | Japan | 61-252003 |
| Oct. 24, 1986 | [JP] | Japan | 61-252004 |

[51] Int. Cl.$^4$ ............................................. B60G 11/26
[52] U.S. Cl. ............................ 280/707; 280/DIG. 1; 280/840
[58] Field of Search ................. 280/707, DIG. 1, 6 R

[56] References Cited

U.S. PATENT DOCUMENTS

| 4,453,725 | 6/1984 | Kuwana et al. | 280/707 |
| 4,483,546 | 11/1984 | Brearly | 280/DIG. 1 |
| 4,647,069 | 3/1987 | Iijima | 280/DIG. 1 |
| 4,655,440 | 4/1987 | Eckert | 280/707 |

FOREIGN PATENT DOCUMENTS

0114757 8/1984 European Pat. Off. .
59-14365 4/1984 Japan .

Primary Examiner—Kenneth R. Rice
Attorney, Agent, or Firm—Fleit, Jacobson, Cohn & Price

[57] ABSTRACT

A vehicle suspension system including a hydraulic cylinder and a gas spring having a gas chamber and a hydraulic chamber which is connected with the hydraulic cylinder. The hydraulic cylinder is located between the vehicle body and the wheel to support the body on the wheels. A control valve is provided for controlling the supply of hydraulic pressure to the cylinder in accordance with a signal from a control unit. The control unit receives a detection signal from a detector which detects the pressure in the cylinder and produces a control signal in accordance with a transfer function $H(s) = R \times S/(1 + R \times S)$.

15 Claims, 11 Drawing Sheets

VEHICLE SUSPENSION SYSTEM HAVING VARIABLE SUSPENSION PROPERTIES

BACKGROUND OF THE INVENTION

1. Field of the Invention

The present invention relates to a vehicle suspension system and more particularly to a vehicle suspension having a variable suspension property.

2. Description of the Prior Art

Conventionally, a vehicle suspension system includes a suspension spring assembly and a shock absorber or an oleo damper which are located in combination between the vehicle body and each wheel. In one type of suspension system, the shock absorber includes a variable orifice and the orifice size is controlled to change the damping property of the shock absorber. Such a vehicle suspension system has a problem in that pitching movements are produced in the vehicle body under a deceleration or an acceleration force and rolling movements are produced under a centrifugal force which i produced in cornering operation.

In order to suppress such movements in the vehicle body, the Japanese patent publication No. 59-14365 proposes a vehicle suspension which includes a hydraulic cylinder located between the vehicle body and the wheel and a gas spring having a gas chamber and a hydraulic chamber. The hydraulic chamber of the gas spring is connected with the hydraulic cylinder through an orifice. According to the proposal by the Japanese patent publication, the level of the vehicle body from the ground is detected and the hydraulic pressure to the cylinder is controlled in accordance with the detection signal.

In the suspension system of this type, the operation of the system can be represented by the following formula:

$$F = kx + c\, dx/dt$$

where;

F is the load on the suspension system,
x is the displacement of the suspension system,
k is the spring coefficient, and
c is the absorption factor.

In the European patent publication No. 0 114 757, there is disclosed a vehicle suspension system which includes a hydraulic cylinder and the pressure to the cylinder is controlled in accordance with a factor determined by the above formula. More specifically the value F and dx/dt are detected and a desired displacement of the cylinder is obtained based on these values. According to the proposal by the European patent application, the desired displacement of the cylinder is changed to thereby change the spring coefficient and/or the damping factor dependent on the external turbulence such as the loads from the road on which the vehicle is running.

It should however be noted that in the suspension system as proposed by the Japanese patent publication or by the European application it is impossible to adjust the suspension property precisely in accordance with the vehicle running condition and the road condition. For example, once the suspension system is adjusted for a rough road to provide a relatively soft suspension property, such property will be maintained even in a cornering operation wherein a relatively hard suspension property is desired. To the contrary, once the suspension system is adjusted for a cornering to provide a relatively hard suspension property so that the rolling of the vehicle body is suppressed, the relatively hard suspension property is maintained even if there is a rough road condition.

SUMMARY OF THE INVENTION

It is an object of the present invention to provide a vehicle suspension system in which the suspension property can be controlled in accordance with the road condition and the vehicle operating condition.

Another object of the present invention is to provide a vehicle suspension system which includes a novel suspension property control means.

A further object of the present invention is to provide a vehicle suspension system in which the suspension property is controlled in accordance with frequencies of the disturbances applied to the suspension system.

According to the present invention, the above and other objects can be accomplished by a vehicle suspension system comprising hydraulic cylinder means provided between a vehicle body and a wheel and adapted for being supplied with hydraulic liquid under pressure to support the vehicle body on the wheel, hydraulic liquid supply means for supplying hydraulic liquid under pressure to apply a liquid pressure to said cylinder means, load detecting means for detecting a load on said cylinder means and producing a detection signal, control means responsive to said detection signal and producing a control signal in accordance with a transfer function between the detection signal and the control signal, said transfer function being a function of $(R \times S)/(1 + R \times S)$, where S is a Laplacian operator and R is a constant, liquid supply adjusting means responsive to said control signal and controlling the hydraulic liquid supplied to said cylinder means in accordance with said control signal.

In analyzing the property of a vehicle suspension system, it is recognized that the frequency of changes in the load applied to the suspension system has an important meaning for example, in case where the frequency of changes in the load is relatively low such as in an occasion experienced in cornering operation, a relatively hard suspension property is desired to prevent rolling and pitching of the vehicle body. To the contrary, when changes in the load are of a relatively high frequency such as in an operation on a rough road, a relatively soft suspension property is desired. The suspension system in accordance with the present invention is effective to control the property in response to changes in the frequency of the load on the suspension system because of the control means which is responsive to the detection signal and producing a control signal in accordance with a transfer function which is a function of $(R \times S)/(1 + R \times S)$. Since the Laplacian operator S includes a factor relating to the frequency, the control signal is a function of the frequency.

According to a preferable aspect of the present invention, the hydraulic cylinder means may be associated with gas spring means which has gas chamber means and hydraulic liquid chamber means. The hydraulic chamber means may then be connected with the cylinder means preferably through orifice means. In another aspect, the transfer function may be a function of $(R \times S)/(1 + R \times S)(1 + R' \times S)$ where B is a constant.

The above and other objects and features of the present invention will become apparent from the following description of preferred embodiments taking reference to the accompanying drawings.

DESCRIPTION OF THE PREFERRED EMBODIMENTS

Figure 1:
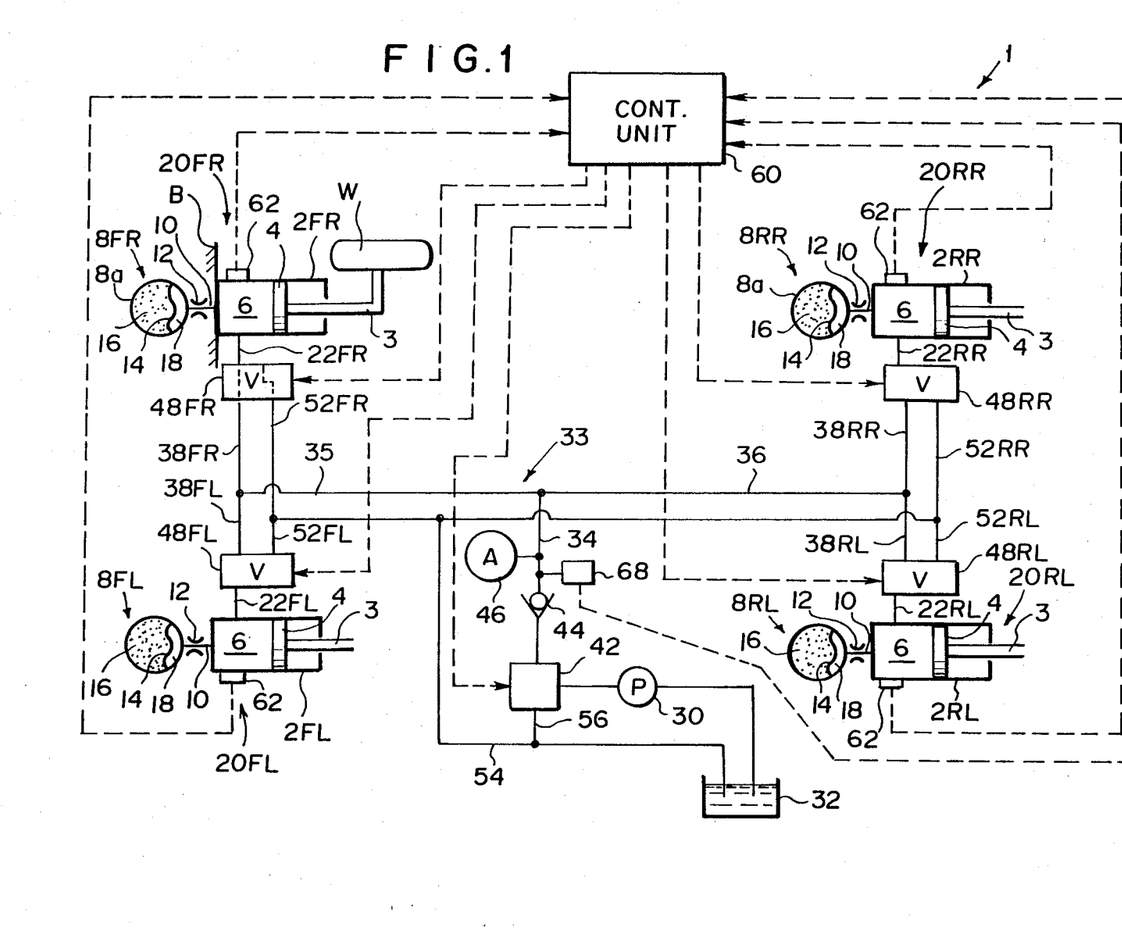
FIG. 1 is a schematic diagram showing a vehicle suspension system in accordance with one embodiment of the present invention.

Referring to the drawings, particularly to FIG. 1, there is shown a vehicle suspension system 1 in accordance with one embodiment of the present invention. In the descriptions, the suffix FR, FL, RR and RL accompanying to reference numerals designate respectively the front right, the front left, the rear right and rear left.

The suspension system 1 includes hydraulic cylinders 2FR, 2FL, 2RR and 2RL which are disposed between a vehicle body B and respective wheels W. The cylinder 2 includes a piston 4 which is connected with a piston rod 3 and a hydraulic chamber 6 of variable volume is defined in the cylinder 2 by the piston 4. The hydraulic chamber 6 of the cylinder 2 is connected with a gas spring 8 through a passage 10 having an orifice 12. The gas spring 8 includes a spherical casing 8a and a diaphragm 14 which divides the interior space of the casing 8a into a gas chamber 16 and a hydraulic chamber 18. The hydraulic chamber 18 of the gas spring 8 is connected with the hydraulic chamber 6 of the cylinder 2. Thus, it will be understood that the cylinder 2 and the gas spring 8 provides a suspension unit 20 having a desired spring and damping actions. The property of the suspension unit 20 is determined by the coefficient of resiliency or the spring coefficient and the flow restriction by the orifice.

The hydraulic chamber 6 of the cylinder 2 has a port which is connected with a conduit 22 which is in turn connected with a hydraulic control valve 48. The suspension system 1 includes a hydraulic pump 30 which is driven by an engine provided on the vehicle. The pump 30 has a suction port connected with a hydraulic liquid reservoir 32 to draw the hydraulic liquid therefrom. The pump 30 also has an outlet port which is connected through a valve 42 and a one-way valve 44 with a pressure line 34 having a pressure accumulator 46. The pressure line 34 is connected with a front pressure line 35 and a rear pressure line 36 which are respectively connected through branch lines 38 to the control valves 48. The control valves 48 are further connected through branch lines 52 with a return line 54 which is in turn connected with the hydraulic liquid reservoir 32.

The control valve 48 functions to take either of a shut-off position, a pressure introducing position and an exhaust position. In the shut-off position, the hydraulic chamber 6 of the cylinder 2 is disconnected from the branch lines 38 and 52. In the pressure introducing position, the chamber 6 is connected through the branch line 38 with the pressure line 34 so that the hydraulic pressure is introduced into the chamber 6. In the exhaust position, the chamber 6 is connected through the branch line 52 with the return line 54 so that the pressure in the chamber 6 is drained to the reservoir 32.

In the shut-off position of the control valve 48, the suspension unit 20 functions as a closed unit and provides a property which is determined by the coefficient of resiliency of the gas spring 8 and the flow restriction by the orifice 12. In other words, the dynamic spring coefficient $dF/dX$, where $dF$ is a change in the load on the cylinder 2 and $dX$ is the displacement of the piston 4, is determined by the property of the gas spring 8 and the orifice 12. This type of suspension system is of a passive type and the functional analysis of the system is shown in FIG. 2.

Figure 2:
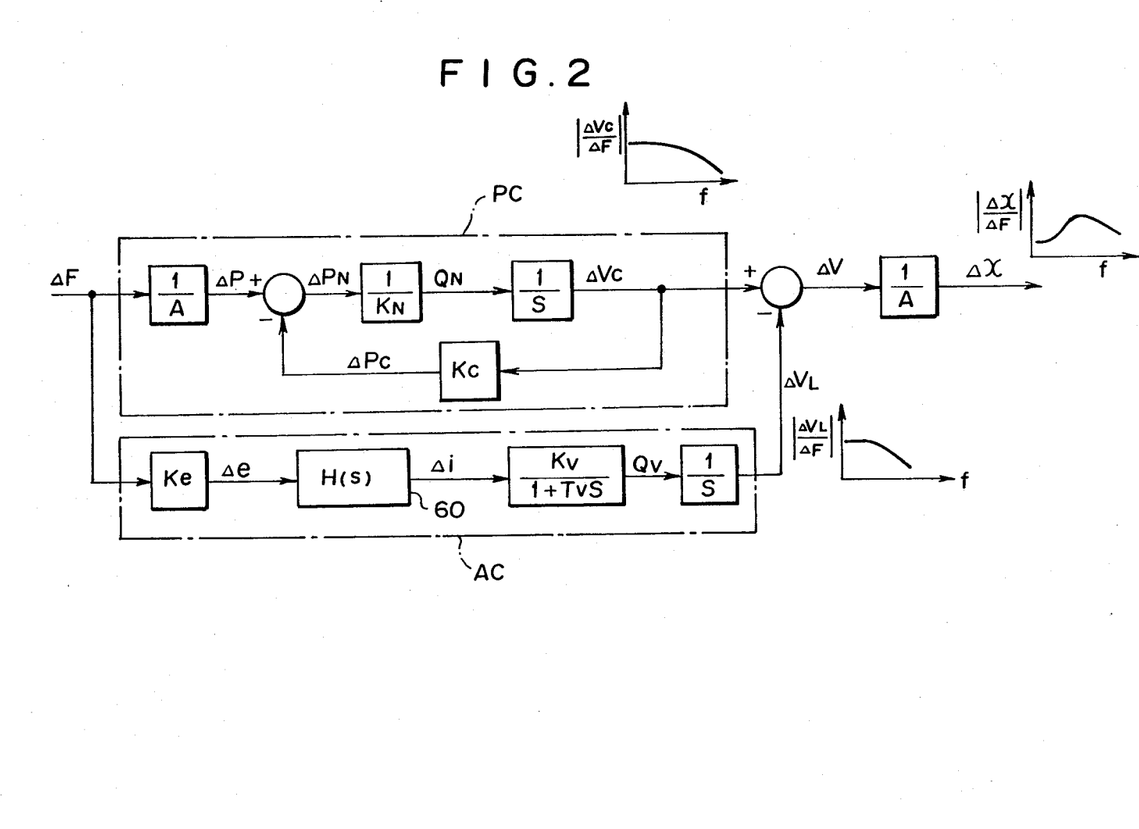
FIG. 2 is a block diagram showing the function of the suspension system.

Referring to FIG. 2, the passive control of the suspension system is shown by a block PC in which the change $dF$ in the load on the cylinder 2 is divided by an area A of the pressure acting face of the piston 4 to obtain a change $dP$ of the pressure in the cylinder 2. The function can be represented by the formula $dP=dF/A$. The pressure change $dP$ is subtracted by a change $dPc$ of the pressure in the gas spring 8 to obtain a change $dPN$ of the pressure drop at the orifice 12. This function can be represented by the formula $dPN=dP-dPc$. The pressure drop change $dPN$ is divided by the flow restriction $KN$ of the orifice 12 to obtain the hydraulic flow $QN$ through the orifice 12. This relationship can be represented by the formula $QN=dPN/KN$. By dividing the flow $QN$ by the Laplacian operator S, it is possible to obtain a change $dVc$ of the volume of the hydraulic chamber 18 of the gas spring 8 through the formula $dVc=QN/S$. The change $dVc$ of the chamber 18 in the gas spring 8 corresponds to the displacement $dX$ of the piston 4. The aforementioned pressure change $dPc$ in the gas spring 8 is obtained by the formula $dPc=Kc\times dVc$, where $Kc$ is the coefficient of resiliency of the gas spring 8.

The operation of the control valve 48 is controlled by a control unit 60. For the operation of the control unit 60, each hydraulic cyclinder 2 is provided at the hydraulic chamber 6 with a pressure detector 62 which produces a pressure signal which is supplied to the control unit 60. The pressure line 34 is also provided with a pressure detector 68 which produces a line pressure signal which is applied to the control unit 60. The control unit 60 produces a control signal which is applied to each control valve 48.

The control valve 48 is operated under the control signal from the control unit 60 to connect the hydraulic chamber 6 of the cylinder 2 either with the pressure line 34 or with the return line 54 to provide an active control. For example, when the piston is moving in the direction of decreasing the volume of the chamber 6 in the cylinder 2, the chamber 6 is connected with the pressure line 34 to thereby introduce the line pressure to the chamber 6 so that the movement of the piston is resisted by an increase in the pressure in the chamber 6. To the contrary, when the piston 4 is moving in the direction of increasing the volume of the chamber 6, the chamber 6 is connected with the return line 54 so that the pressure in the chamber 6 is partly released to decrease the pressure so that the movement of the piston is resisted by the pressure change.

The function of the suspension system under the active control is shown by a block AC in FIG. 2. The load change dF is converted into a pressure change de by the pressure detector 62 and this relationship is represented by the formula $de = Ke \times dF$, where Ke is the characteristics of the pressure detector 62. The control signal di is produced by the control unit 60 which performs a calculation in accordance with a transfer function H(s). The control signal di is applied to the control valve 48 to actuate the same so that a flow of the hydraulic liquid Qv is produced in the control valve 48. The relationship between the control signal di and the liquid flow Qv can be represented by the formula $Qv = di \cdot Kv/(1+Tv \cdot S)$, where $Kv/(1+Tv \cdot S)$ is the characteristics of the control valve 48. The quantity of the hydraulic liquid in the cylinder 2 is changed by an amount dVL which is calculated by the formula $dVL = Qv/S$. Thus, the volume change dVc produced in the passive control is modified in accordance with the volume change dVL produced in the active control and the resultant volume change dV is effective to produce the piston displacement dX.

Figure 3:
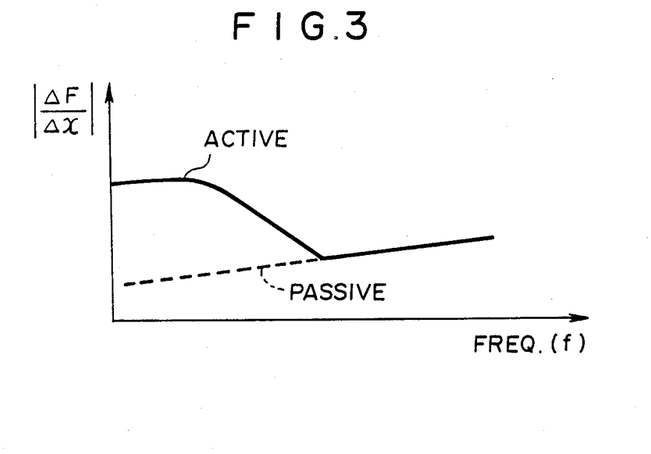
FIG. 3 is a diagram showing a desirable suspension property of a vehicle suspension system.

The transfer function H(s) is a function of $A \cdot S/(1+A \cdot S)$ as described hereinafter. Referring to FIG. 3, there is shown a desirable relationship between the frequency of the load and the dynamic spring coefficient dF/dX. The relationship can be represented by the formula $$dF/dX = (K_1 + K_2 \cdot S)(N + T \cdot S)/(1 + T \cdot S) \quad (1)$$

where: S is a Laplacian operator;
T is a time constant;
N is a constant;
$K_1$ and $K_2$ are constants.

The formula (1) can be rewritten into the following formula:

$$dX/dF = (1 + T \cdot S)/(N + T \cdot S)(K_1 + K_2 \cdot S) \quad (2)$$

The volume change dVc of the liquid chamber 18 in the gas spring 8 can be represented by the formula $$dVc = dF/A(Kc + KN \cdot S) \quad (3)$$

The volume change dVL of the hydraulic chamber 6 of the cylinder 2 can be represented by the following formula $$dVL = Kv \cdot Ke \cdot H(s) \cdot dF/(1 + Tv \cdot S)S \quad (4)$$

The piston displacement dX is represented by the formula $$dX = (1/A(Kc+KN \cdot S) - Kv \cdot Ke \cdot H(s)/(1+TV \cdot S)S) \times dF/A \quad (5)$$

The formula (5) can be rewritten into the following formula $$dX/dF = (1+Tv \cdot S)S - A \cdot Kv \cdot Ke(Kc+KN \cdot S)H(s)/A^2(Kc+KN \cdot S)(1+Tv \cdot S)S \quad (6)$$

In the formula (2), the following substitutions are made $$K_1 = A^2 Kc$$

$$K_2 = A^2 KN$$

$$T = N \cdot Tv$$

Then, the following formula is obtained from the formula (2)

$$dX/dF = (1+N \cdot Tv \cdot S)/N \, A^2(Kc+KN \cdot S)(1+Tv \cdot S) \quad (7)$$

From the formulae (6) and (7), the following formula can be obtained.

$$(1+Tv \cdot S) - A \cdot Kv \cdot Ke(Kc+KN \cdot S)H(s)/S = (1+N \cdot Tv \cdot S)/N \quad (8)$$

The formula (8) can be rewritten as follows:

$$H(s) = ((1-1/N)/A \cdot Kv \cdot Ke \cdot KN)((KN/Kc)S/(1+(KN/Kc)S) = (1+M \cdot Tv \cdot S)/N \quad (9)$$

Figure 4:
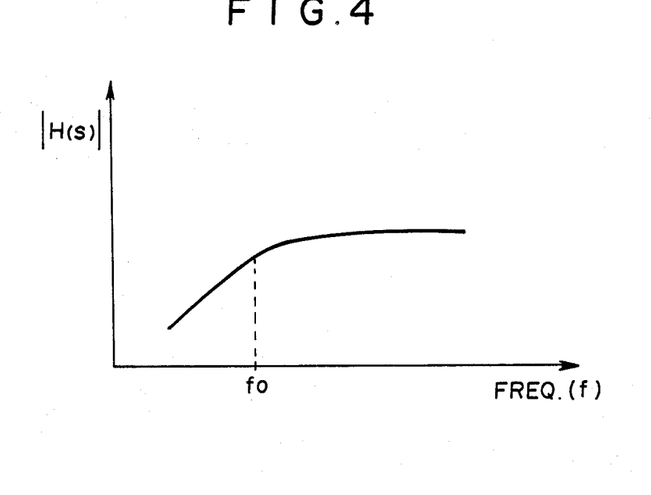
FIG. 4 is a diagram showing an example of the transfer function for the control unit shown in FIG. 2.

Since the clause $(1-1/N)/A \cdot Kv \cdot Ke \cdot KN$ in the formula (9) is constant, variable factors are included only in the clause $(KN/Kc)S/(1+(KN/Kc)S)$. By substituting the constant KN/Kc by a reference character R, it is possible to rewrite the clause to read $(R \cdot S)/(1+R \cdot S)$. It will therefore be understood that by controlling the control valve 48 with the control unit 60 in accordance with the transfer function H(s) which is a function of $(R \cdot S)/(1+R \cdot S)$ it is possible to obtain the relationship as shown in FIG. 3. The property of the transfer function H(s) is shown in FIG. 4.

Figure 15:
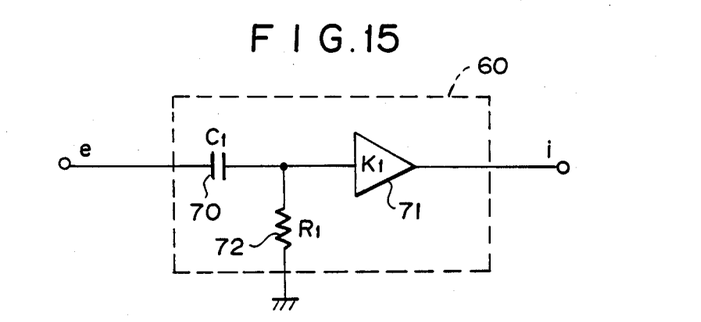
FIG. 15 is a diagram showing an example of a circuit for carrying out the operation under the transfer function.

FIG. 15 shows an example of the circuit which can be used as the control unit 60. The circuit 60 includes a capacitor having a capacity $C_1$ and connected on one hand with the pressure detector 62 to receive the detection signal e and on the other hand with an amplifier 71 which has an amplification rate corresponding to the clause $(1-1/N)/A \cdot Kv \cdot KeNN$ in the formula (9). A resistor 72 is connected at one end between the capacitor 70 and the amplifier 71 and grounded at the other end. The resistor 72 has a resistance $R_1$ which is determined so that the relationship $R = R_1 C_1$ is established. The cut-off frequency $f_o$ shown in FIG. 4 will be $f_o = \frac{1}{2}\pi R$.

Figure 16:
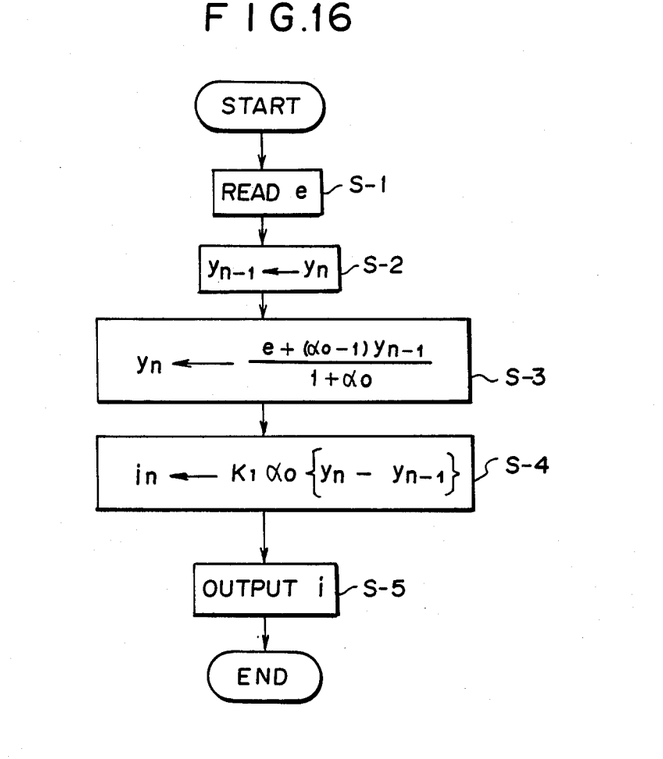
FIG. 16 is a flow chart showing the operation of the control unit in an embodiment wherein the control unit is provided by a microprocessor.

The control unit 60 may be provided by a microprocessor. FIG. 16 shows the operation of the microprocessor in the form of a flow chart. In the operation, a variable factor yn and a constant ao are used. The factor $a_o$ is defined by a formula $a_o = 1/\pi f_o T$, where T is a sampling period. The variable $y_n$ is obtained by the formula $$y_n = (e + (a_o - 1)y_{n-1})/(1 + a_o)$$

The control signal $i_n$ is obtained by the following formula $$i_n = K_o A_o(y_n y_{n-1})$$

In operation, the detection signal e is read in the step S-1 and the value $y_n$ which has previously been obtained is shifted to the value $y_{n-1}$ in the step S-2. The newly shifted value $y_{n-1}$ is memorized in the memory of the microprocessor. Then, a calculation is carried out in the step S-3 to obtain the value $y_n$ by the aforementioned formula. Thereafter, the step S-4 is carried out to obtain the control signal $i_n$ by the formula previously described. The control signal $i_n$ is then applied to the control valve 48.

Figure 5:
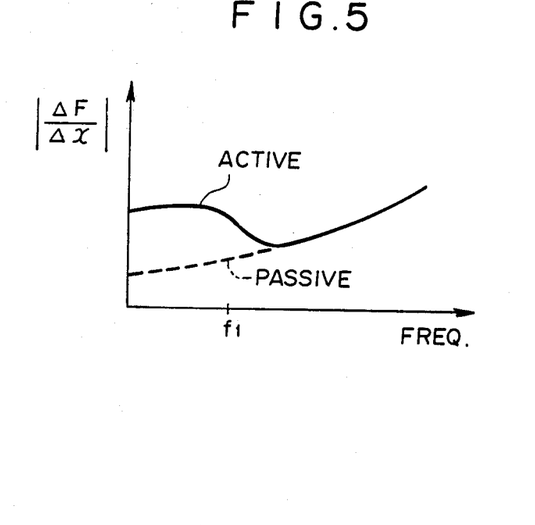
FIG. 5 is a diagram similar to FIG. 3 but showing another desirable feature.
Figure 6:
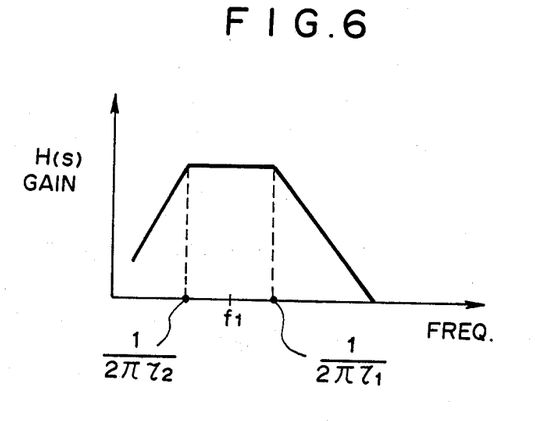
FIG. 6 is a diagram showing a transfer function for obtaining the property shown in FIG. 5.

Referring now to FIGS. 5 through 8, it will be noted that FIG. 5 is similar to FIG. 3 and in order to obtain the property shown in FIG. 5 the control unit 60 is designed so that signals having a frequency higher than $\frac{1}{2}\pi\tau_2$ and those having a frequency lower than $\frac{1}{2}\pi\tau_1$ are cut as shown in FIG. 6, the frequency $f_1$ being the resonance point of the sprung mass which is obtained by the following formula.

$$f_1 = 1/2\pi \sqrt{K_1 K_2/m_1 (K_1 + K_2)} \quad (10)$$

As the result, the function of the control unit 60 can be represented by the following formula.

$$H(s) = 1 \cdot \tau_2 \cdot S / (\overline{\tau_1} \cdot S + I(\tau_2 \cdot S + 1))$$

Figure 7:
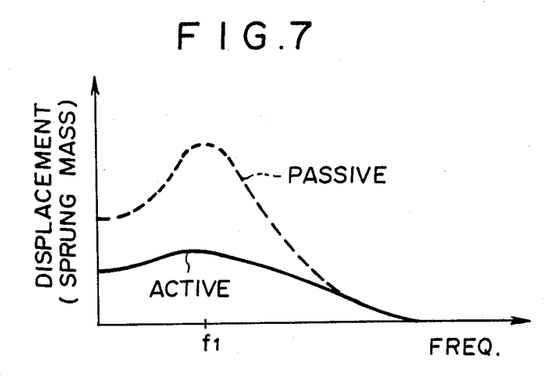
FIG. 7 is diagram showing the relationship between the displacement and the frequency.
Figure 8:
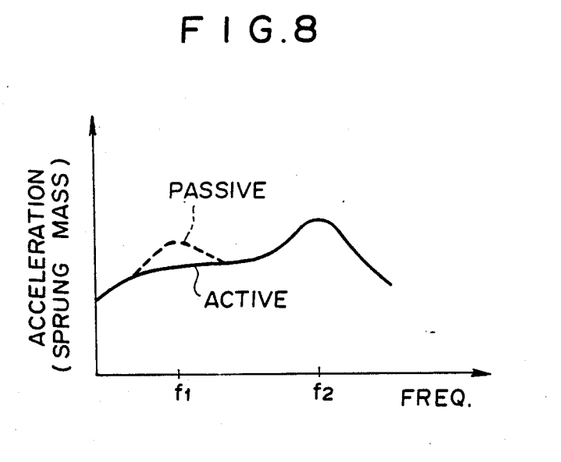
FIG. 8 is a diagram showing the acceleration of the sprung mass.

The suspension system thus obtained is of an active type in the vicinity of the resonance frequency $F_1$ as shown in FIG. 7. In the high frequency range, the suspension property is of a passive type as shown. Further, the acceleration of the sprung mass will be as shown in FIG. 8.

Figure 17:
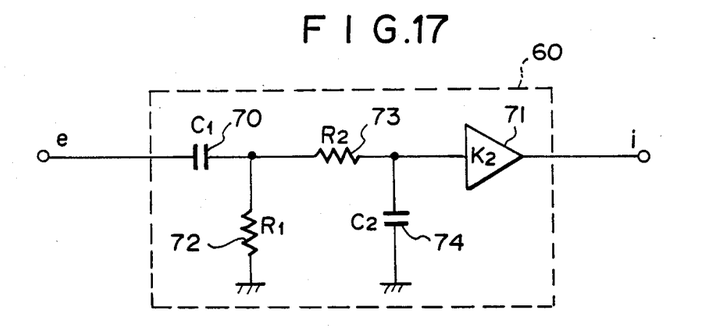
FIG. 17 is a diagram similar to FIG. 15 but showing another example.

FIG. 17 shows an example of the circuit for providing the function as shown in FIG. 6. The circuit in FIG. 17 is different from that in FIG. 15 in that a resistor 73 is disposed between the amplifier 71 and the resistor 72 and a capacitor 74 is arranged so that it is connected at one end between the resistor 73 and the amplifier 71 and at the other end to the ground.

It will be noted that the formula (10) can be rewritten as $H(s) = K \times (R \cdot S)/(1 + R \cdot S) \times 1/(1 + R' \cdot S)$ by substituting G1 by K, $\tau_1$ by R and $\tau_2$ by R'. In the circuit shown in FIG. 17, the resistance value of the resistor 72 may be designated by R1, that of the resistor 73 by R2, the capacitance of the capacitor 70 by C1 and that of the capacitor 74 by C2. Then, these values are determined so that the following relationship can be met.

$$R = R1 \times C1$$

$$R' = R2 \times C2$$

Figure 18:
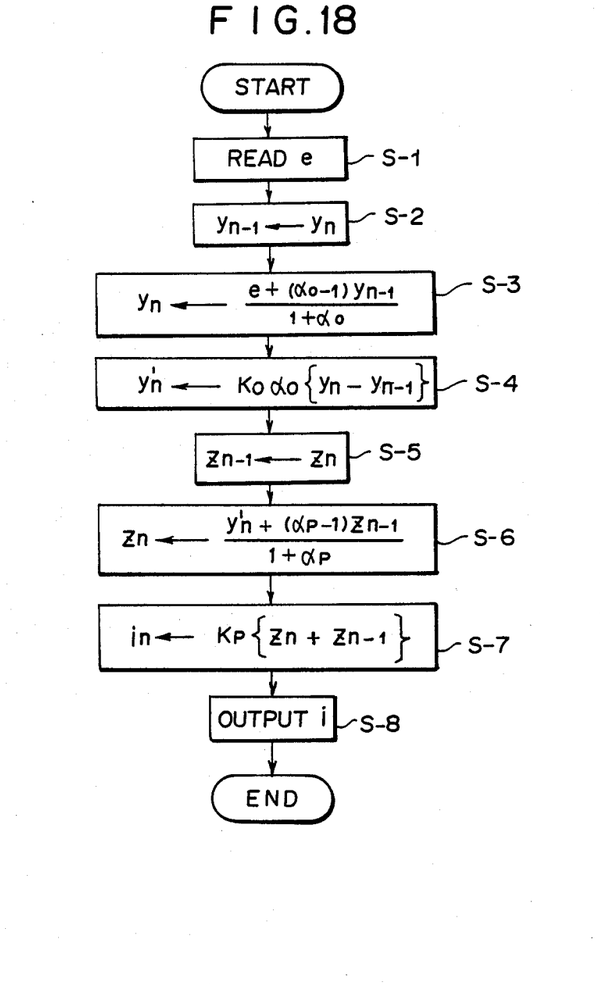
FIG. 18 is a flow chart similar to FIG. 16 but showing a different example; and, FIG. 19 is a diagram similar to FIG. 15 but showing a further example.

FIG. 18 shows a flow chart corresponding to FIG. 16 but for providing the function shown in FIG. 6. The steps S-1 through S-3 are the same as in the corresponding steps in FIG. 16. In the step S-4, a calculation is made to obtain by a formula yn=Ko ao (yn - yn-1). then, the value $z_n y_n'$ by a formula $Y_n' = K_o a_o(y_n - y_{n-1})$. Then the value $z_n$ which has previously been obtained is shifted to $z_{n-1}$ in the step S-5. A calculation is thereafter made in step S-6 to obtain the value $z_n$ by a formula $$z_n = (y_n' + (a_p - 1)z_{n-1})/(1 + a_p)$$

The control signal $i_n$ is then obtained in the step S-6 by the formula $$i_n = K_p(z_n - z_{n-1})$$

Thus, an output is produced in step S-8.

Figure 9:
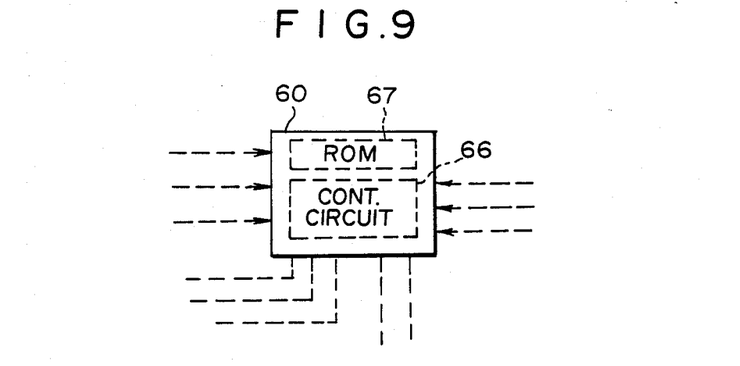
FIG. 9 is a diagrammatical illustration of the control unit which can be used in lieu of the control unit used in the embodiment of FIG. 1.
Figure 10:
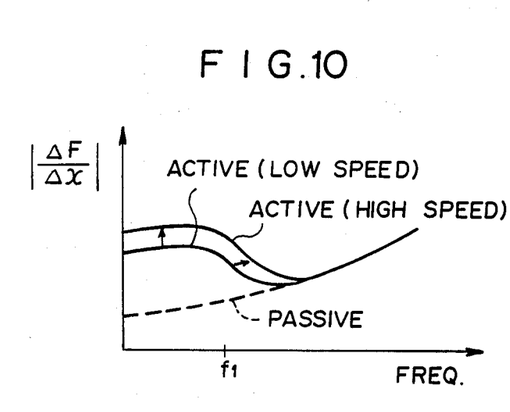
FIG. 10 is a diagram similar to FIG. 5 but showing another embodiment.
Figure 11:
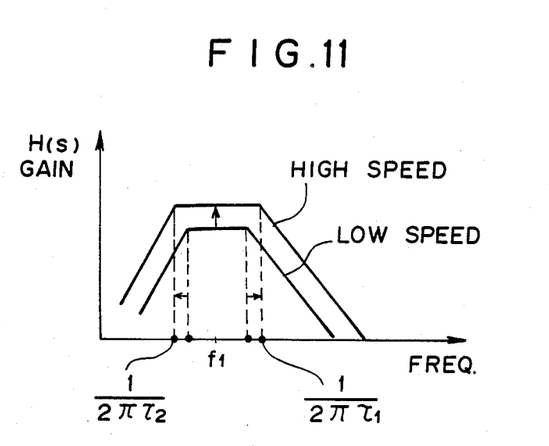
FIG. 11 is a diagram similar to FIG. 6 but corresponding to the embodiment shown in FIG. 5.
Figure 12:
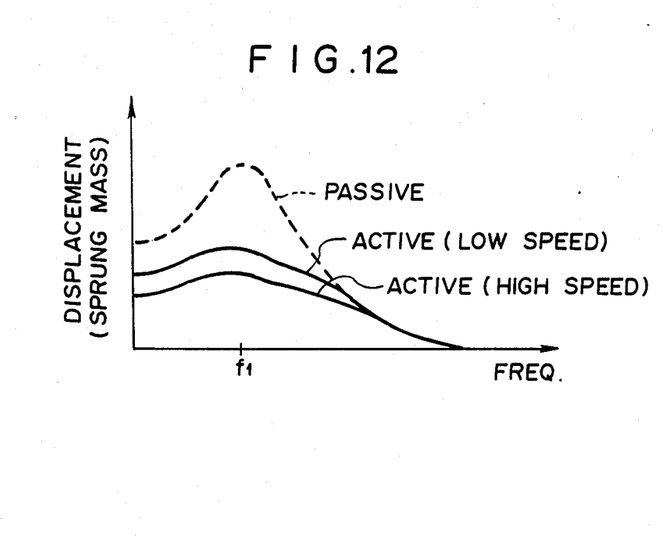
FIG. 12 is a diagram similar to FIG. 7 but corresponding to the embodiment of FIG. 5.
Figure 13:
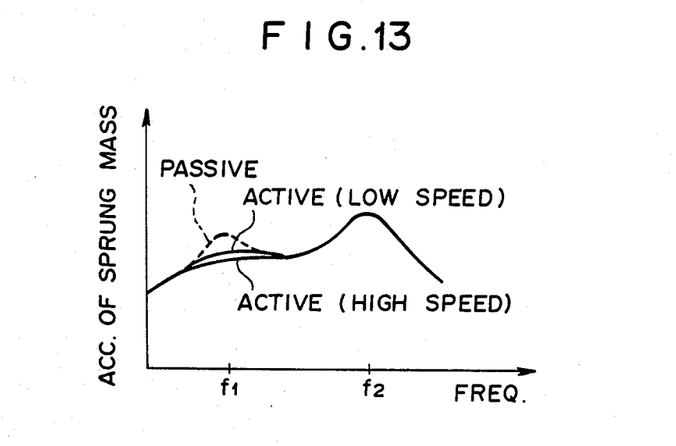
FIG. 13 is a diagram similar to FIG. 8 but corresponding to the embodiment of FIG. 5.

Referring now to FIG. 9, it will be noted that control unit 60 includes a control circuit 66 and a read-only memory (ROM) 67. The ROM 67 has memories of the parameters G1, $\tau_1$, and $\tau_2$ for various vehicle speeds. More specifically, it has memories of such parameters which change in accordance with the vehicle speed so that the parameters G1 and $\tau_1$ are increased as the vehicle speed increases and the parameter $\tau_2$ is decreased as the vehicle speed increases. With this control, the function H(s) is changed in accordance with the vehicle speed as shown in FIG. 11 and a suspension property is also changed in accordance with the vehicle speed as shown in FIG. 10. The displacement of the sprung mass changes in accordance with the vehicle speed as shown in FIG. 12. Further, the acceleration of the sprung mass is also changed in accordance with the vehicle speed as shown in FIG. 13.

Figure 19:
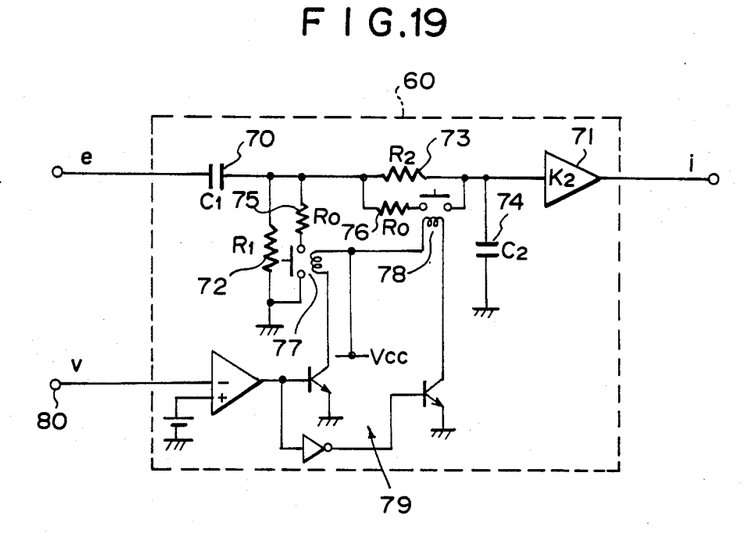

FIG. 19 shows an example of the circuit which can perform the function as shown in FIG. 11. The circuit is different from the circuit shown in FIG. 17 in that a resistor 75 is arranged in parallel with the resistor 72 and a resistor 76 is arranged in parallel with the resistor 73. In the line connecting the resistor 75 to the ground, there is provided a relay 77 whereas a relay 78 is provided in series with the resistor 76. The relays 77 and 78 are controlled by a relay control circuit 79 in accordance with a vehicle speed signal from a speed detector 80 in such a manner that the relays 77 and 78 are closed when the vehicle speed is low.

When the control circuit 66 is made of a microprocessor, the factors $K_o$, $K_p$, $a_o$ and $a_p$ are selected so that the factors $K_o$, $K_p$ and $a_p$ are increased in the low speed range and the factor $a_o$ is decreased in the low speed range.

Figure 14:
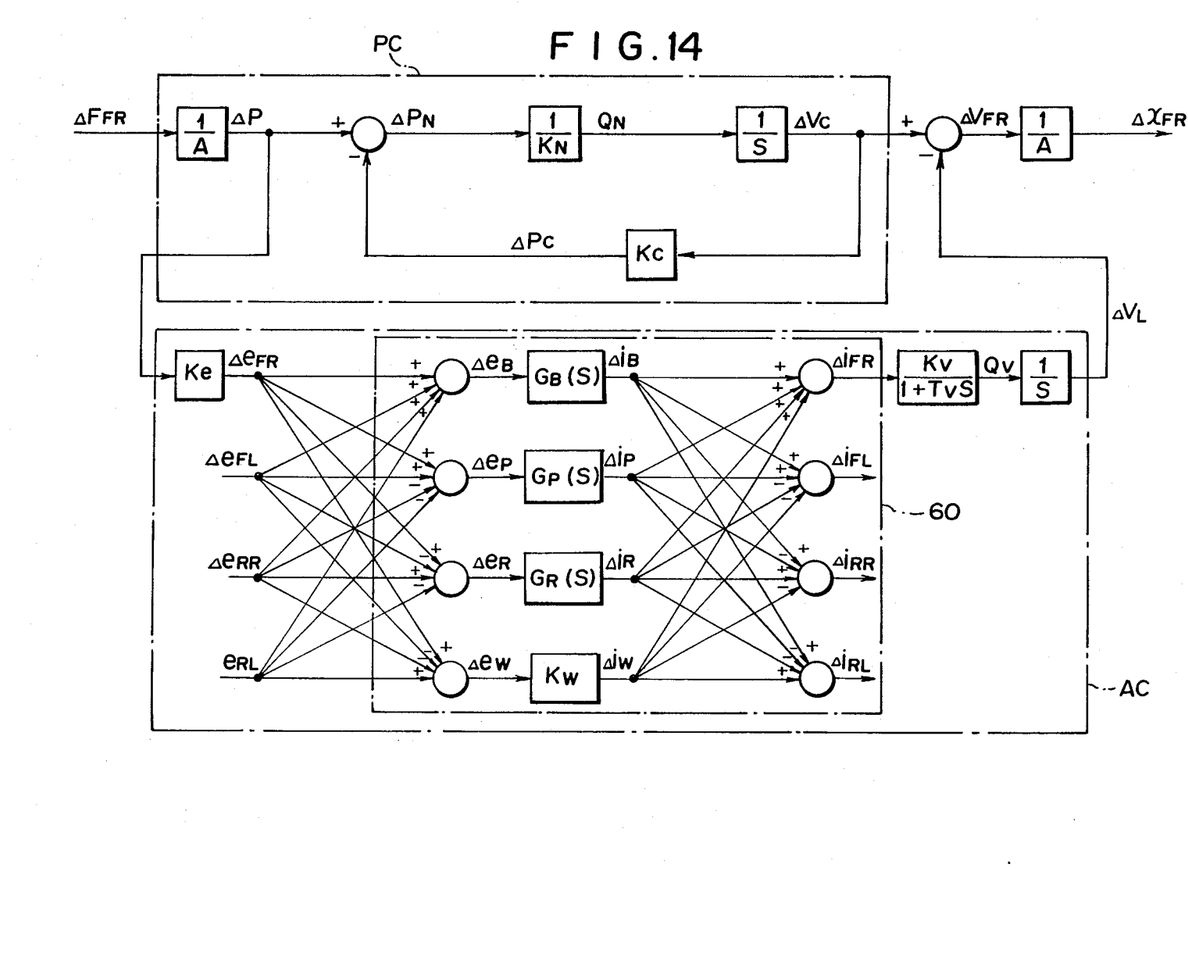
FIG. 14 is a block diagram showing another example of the control unit.

FIG. 14 shows an analysis of the suspension system in which the suspension property is controlled in the system of each wheel. The control in the passive type is the same as that described with reference to FIG. 2. In the control of the active type, the detection signals $de_{FR}$, $de_{FL}$, $de_{RR}$ and $de_{RL}$ are used to obtain a bouncing signal $de_b$, a pitch signal $de_P$, a roll signal deR and a warp signal $de_W$. The signal $de_b$ is obtained by the formula:

$$de_B = de_{FR} + de_{FL} + de_{RR} + de_{RL}$$

The signal $de_P$ is obtained by the formula:

$$de_p = (de_{FR} + de_{FL}) - (de_{RR} + de_{RL})$$

The signal $de_R$ is obtained by the formula:

$$de_R = (de_{FR} = de_{FL}) + (de_{RR} - ee_{RL})$$

The signal $de_W$ is obtained by the formula:

$$de_W = (de_{FR} = de_{FL}) - (de_{RR} - de_{RL})$$

The signals $de_B$, $de_P$, and $de_R$ are processed by the control circuit with the transfer functions HB(s), HP(s), and HR(s) to produce signals diB, diP and diR, respectively. The signal deW is multiplied with a constant Kw to obtain a control signal diW. Required quantities of the liquid flow to the cylinders 2 of the respective wheels are calculated and corresponding signals $di_{FR}$, $di_{FL}$, $di_{RR}$ and $di_{RL}$ are obtained.

The invention has thus been shown and described with reference to specific embodiments, however, it should be noted that the invention is in no way limited to the details of the illustrated arrangements but changes and modifications can be made without departing from the scope of the appended claims.

I claim:

1. A vehicle suspension system comprising
hydraulic cylinder means provided between a vehicle body and a wheel and adapted for being supplied with hydraulic liquid under pressure to support the vehicle body on the wheel,
hydraulic liquid supply and delivery means for adjusting the quantity of hydraulic liquid under pressure in said cylinder means thereby adjusting the system for hardness,
frequency detecting means for detecting the frequency of load changes imposed on the suspension system due to road conditions and for producing a detection signal dependent on the frequency, and
control means for utilizing said detection signal to control said liquid supply an delivery means to provide a relatively soft suspension property within the suspension system when the frequency detected is relatively high and to provide a relatively hard suspension property within the suspension system when the frequency is relatively low.

2. A vehicle suspension system in accordance with claim 1 in which said cylinder means is provided with gas spring means.

3. A vehicle suspension system in accordance with claim 2 which said gas spring means includes casing means having an interior space divided by diaphragm means into gas chamber means and hydraulic liquid chamber means, said hydraulic liquid chamber means being connected with said cylinder means.

4. A vehicle suspension system in accordance with claim 3 in which said liquid chamber means is the gas spring means is connected with said cylinder means through orifice means.

5. A vehicle suspension system in accordance with claim 1 in which said load detecting means i pressure detecting means for detecting pressure of liquid in said cylinder means.

6. A vehicle suspension system in accordance with claim 1 in which said liquid supply adjusting means is control valve means for controlling liquid flow into and from the cylinder means.

7. A vehicle suspension system in accordance with claim 1 in which said cylinder means, load detection means and liquid supply adjusting means are provided for each wheel of the vehicle, the detection signals for the respective wheels are processed to obtain signals representing bounce, pitch, roll and warp of the vehicle.

8. A vehicle suspension system in accordance with claim 1 in which said transfer function is $$R \times S/(1 + R \times S)(1 + R' \times S)$$

where R' is a constant.

9. A vehicle suspension system in accordance with claim 8 which further includes vehicle operating condition detecting means for detecting a vehicle operating condition to produce a vehicle operating condition signal and means for changing said transfer function in accordance with said vehicle operating condition signal.

10. A vehicle suspension system in accordance with claim 9 in which said changing means is means for changing the constants in the transfer function.

11. A vehicle suspension system in accordance with claim 9 in which said changing means is means for changing a gain of the transfer function.

12. A vehicle suspension system in accordance with claim 9 in which said vehicle operating condition detecting means is means for detecting a vehicle speed.

13. A vehicle suspension system in accordance with claim 1 which includes signal producing means in said control means for producing a control signal for controlling said liquid supply adjusting means in response to said detection signal, said control signal being connected with the detection signal through a transfer function of $(R \times S)/(1 + R \times S)$, where S is a Laplacian operator and R is a constant.

14. A vehicle suspension system in accordance with claim 1 wherein said frequency detecting means is constituted by load detecting means for detecting the frequency of load changes on said cylinder means.

15. A vehicle suspension system in accordance with claim 14 wherein said frequency detecting means is constituted by a pressure detecting means for detecting pressure changes in said cylinder means.

* * * * *